(12) United States Patent
Liu et al.

(10) Patent No.: US 11,944,942 B1
(45) Date of Patent: Apr. 2, 2024

(54) POLYETHER BLOCK POLYAMIDE/POLYDIMETHYLSILOXANE COMPOSITE MEMBRANE FOR GAS SEPARATION, AND PREPARATION METHOD AND USE THEREOF

(71) Applicant: NANJING TECH UNIVERSITY, Jiangsu (CN)

(72) Inventors: Gongping Liu, Jiangsu (CN); Jiangying Liu, Jiangsu (CN); Wanqin Jin, Jiangsu (CN); Yang Pan, Jiangsu (CN)

(73) Assignee: NANJING TECH UNIVERSITY, Jiangsu (CN)

( * ) Notice: Subject to any disclaimer, the term of this patent is extended or adjusted under 35 U.S.C. 154(b) by 0 days.

(21) Appl. No.: 18/337,452

(22) Filed: Jun. 20, 2023

(30) Foreign Application Priority Data

Oct. 17, 2022 (CN) .......................... 202211267933.8

(51) Int. Cl.
*B01D 53/22* (2006.01)
*B01D 67/00* (2006.01)
(Continued)

(52) U.S. Cl.
CPC ........... *B01D 71/80* (2013.01); *B01D 53/228* (2013.01); *B01D 67/0006* (2013.01); *B01D 67/0011* (2013.01); *B01D 67/0013* (2013.01); *B01D 67/009* (2013.01); *B01D 69/1214* (2022.08); *B01D 71/5211* (2022.08);
(Continued)

(58) Field of Classification Search
CPC .. B01D 53/228; B01D 71/56; B01D 69/1214; B01D 67/0013; B01D 2323/219; B01D 71/701; B01D 71/80; B01D 67/009; B01D 71/5211; B01D 67/0006; B01D 2323/30; B01D 67/0011; B01J 20/3085; B01J 20/267; B01J 20/28035; C08G 77/46
See application file for complete search history.

(56) References Cited

U.S. PATENT DOCUMENTS

2007/0151447 A1* 7/2007 Merkel ................. B01D 63/10
95/52
2010/0313752 A1* 12/2010 Powell ................. B01D 53/228
521/154

(Continued)

*Primary Examiner* — Anthony R Shumate
(74) *Attorney, Agent, or Firm* — JCIPRNET

(57) ABSTRACT

The present disclosure relates to a polyether block polyamide/polydimethylsiloxane (PDMS) composite membrane for gas separation, and a preparation method and use thereof, and belongs to the technical field of membrane separation. In the present disclosure, an amphoteric copolymer PDMS-polyethylene oxide (PEO) (PDMS-b-PEO) is introduced into an intermediate layer to adjust the interfacial binding performance, thereby promoting preparation of an ultra-thin polyether block polyamide composite membrane. Studies have shown that the surface enrichment of PEO segments not only inhibits a dense $SiO_x$ layer formed due to a plasma treatment of a PDMS intermediate layer, but also provides additional hydrophilic sites and interfacial compatibility for the subsequent selective layer. The use of PDMS-b-PEO in an intermediate layer allows the successful preparation of a selective layer with a thickness of about 50 nm.

4 Claims, 9 Drawing Sheets

(51) Int. Cl.
*B01D 69/12* (2006.01)
*B01D 71/52* (2006.01)
*B01D 71/56* (2006.01)
*B01D 71/70* (2006.01)
*B01D 71/80* (2006.01)
*B01J 20/26* (2006.01)
*B01J 20/28* (2006.01)
*B01J 20/30* (2006.01)
*C08G 77/46* (2006.01)

(52) U.S. Cl.
CPC ........... *B01D 71/56* (2013.01); *B01D 71/701* (2022.08); *B01J 20/267* (2013.01); *B01J 20/28035* (2013.01); *B01J 20/3085* (2013.01); *C08G 77/46* (2013.01); *B01D 2323/219* (2022.08); *B01D 2323/30* (2013.01)

(56) References Cited

U.S. PATENT DOCUMENTS

| | | | |
|---|---|---|---|
| 2015/0273407 A1* | 10/2015 | Gil | C02F 1/44 |
| | | | 530/370 |
| 2016/0015653 A1* | 1/2016 | Fuisz | A61K 8/8176 |
| | | | 424/443 |
| 2016/0220966 A1* | 8/2016 | Kano | B01D 69/02 |
| 2016/0243525 A1* | 8/2016 | Song | B01J 20/226 |
| 2017/0239627 A1* | 8/2017 | Weber | A23L 2/74 |
| 2018/0065105 A1* | 3/2018 | Song | B01J 20/28035 |
| 2018/0257044 A1* | 9/2018 | Gronwald | B01D 69/02 |
| 2018/0272286 A1* | 9/2018 | Gronwald | B01D 69/141 |
| 2019/0351374 A1* | 11/2019 | Kumar | B01D 69/105 |
| 2019/0358593 A1* | 11/2019 | Staudt | B01D 71/68 |
| 2023/0182086 A1* | 6/2023 | Ho | B01D 69/02 |
| | | | 95/51 |

* cited by examiner

POLYETHER BLOCK POLYAMIDE/POLYDIMETHYLSILOXANE COMPOSITE MEMBRANE FOR GAS SEPARATION, AND PREPARATION METHOD AND USE THEREOF

CROSS-REFERENCE TO RELATED APPLICATION

This application claims the priority benefit of China application serial no. 202211267933.8, filed on Oct. 17, 2022. The entirety of the above-mentioned patent application is hereby incorporated by reference herein and made a part of this specification.

TECHNICAL FIELD

The present disclosure relates to a polyether block polyamide (PE-b-PA)/polydimethylsiloxane (PDMS) composite membrane for gas separation, and a preparation method and use thereof, and belongs to the technical field of membrane separation.

BACKGROUND

Excess carbon dioxide emissions from flue gas and fossil fuel combustion exacerbate some serious environmental problems, such as the greenhouse effect, the climate change, and the melting glaciers. Membrane separation is considered as a candidate technique for efficient carbon capture due to its advantages such as low cost, feasible scale-up and upgrade, and energy conservation. There has been a large amount of research on polymer membranes, involving varying degrees of carbon dioxide selectivity and permeability. A separation process of a polymer membrane follows a solution-diffusion mechanism. An affinity of a membrane material for carbon dioxide and a free volume of mass transport dominate the carbon dioxide/nitrogen dioxide separation performance.

PE-b-PA (such as Pebax®) and PDMS are representative rubber polymer materials for gas separation. A polyethylene oxide (PEO) segment allows Pebax to have a strong affinity for carbon dioxide, and a polyamide (PA) glass segment increases the resistance for mass transport. In addition, PDMS with a soft backbone chain and a high free volume fraction shows obvious advantages in a permeation rate. Although positive research has been performed on the development of PDMS membranes and Pebax membranes, a trade-off relationship between a permeation rate and selectivity still limits the carbon dioxide separation performance. Both the ultra-fine thickness and the integrity of a selective layer are indispensable for improvement of a gas permeation rate of an intrinsically-selective membrane. However, a low-concentration casting solution will inevitably invade nanopores of a support, resulting in a decrease in the gas permeation rate and selectivity.

The interfacial compatibility between an intermediate layer and a selective layer is critical for a multilayer membrane. However, in order to develop an ultra-thin Pebax composite membrane, a hydrophilic Pebax casting solution needs to be uniformly deposited on a hydrophobic PDMS intermediate layer, which is difficult. Therefore, the hydrophilic modification pretreatment of a surface of PDMS is usually adopted to improve an interfacial binding force of a Pebax selective layer to a PDMS intermediate layer. So far, surface modification strategies have been largely based on the application of high-energy irradiation (such as plasma and ultraviolet (UV)) to break strong Si—C and Si—O—Si bonds and produce a large number of hydroxyl groups. The current strategies have several limitations in terms of completing practical applications. 1. The rearrangement of oligomers leads to the rapid recovery of hydrophobicity in a PDMS intermediate layer. 2. A treatment process requires a specific atmosphere (such as pure oxygen) to provide sufficient free radicals, which increases the equipment investment and limits the large-scale production. There are few reports on the direct use of air as a treatment atmosphere. This is because a volume fraction of oxygen in air is too low to produce enough oxygen free radicals, which limits an effect of hydrophilic modification. Although a significant progress has been made in $CO_2/N_2$ separation performance, interfacial defects induced by non-uniformity on a PDMS surface and a limited treatment time lead to a relatively-low gas permeation rate. In addition, during a plasma treatment of a PDMS intermediate layer, a $SiO_x$ layer with high transport resistance is inevitably formed, which inhibits the further improvement of a gas permeation rate.

SUMMARY

The present disclosure is intended to solve the following technical problems: The hydrophobicity of a PDMS intermediate layer leads to low interfacial adhesion of an ultra-thin PE-b-PA (Pebax®) composite membrane, and a $SiO_x$ layer formed in a plasma treatment of a PDMS intermediate layer inhibits a gas permeation rate.

In the technical solution of the present disclosure, an amphoteric copolymer polydimethylsiloxane block polyethylene oxide (PDMS-b-PEO) is incorporated into PDMS to form an intermediate layer. An effect of the copolymer to improve the hydrophilicity can be activated by an air plasma treatment, and an air atmosphere is sufficient to construct a surface with high polarity. A PEO segment of the copolymer PDMS-b-PEO self-migrates to a surface of an intermediate layer to maintain hydrophilicity, thereby largely enhancing the interfacial compatibility with a Pebax selective layer. Therefore, it is feasible to prepare an ultra-thin multi-layer composite membrane. To investigate the interfacial binding performance, a chemical environment and a composition change of a surface of an intermediate layer after an air plasma treatment are comprehensively investigated. In order to pursue high $CO_2/N_2$ separation performance of an ultra-thin Pebax/PDMS-PEO/PAN composite membrane, preparation conditions such as the plasma treatment duration, the incorporated copolymer amount, and the Pebax casting solution concentration are optimized.

A PE-b-PA/PDMS composite membrane for gas separation is provided, including: a support layer, an intermediate layer, and a selective layer, where the intermediate layer includes hydroxyl-terminated PDMS and PDMS-b-PEO, and the selective layer is made of PE-b-PA.

A mass ratio of the hydroxyl-terminated PDMS to the PDMS-b-PEO in the intermediate layer is 1:(0.5-1.5).

The hydroxyl-terminated PDMS and the PDMS-b-PEO in the intermediate layer are crosslinked.

A crosslinking agent used in crosslinking of the hydroxyl-terminated PDMS and the PDMS-b-PEO is tetraethyl orthosilicate (TEOS).

The hydroxyl-terminated PDMS has a molecular weight of 20,000 to 200,000, and the PDMS-b-PEO has a molecular weight of 2,000 to 20,000; and the PE-b-PA is Pebax®.

A preparation method of the PE-b-PA/PDMS composite membrane for gas separation is provided, including the following steps:

step 1: thoroughly mixing the hydroxyl-terminated PDMS, the crosslinking agent, a catalyst, the PDMS-b-PEO, and a first solvent to obtain an intermediate layer casting solution, coating the intermediate layer casting solution on a surface of the support layer, and performing a heat treatment; and step 2: dissolving the PE-b-PA in a second solvent, coating a resulting casting solution on a surface of the intermediate layer obtained in the step 1, and performing a heat treatment to obtain the PE-b-PA/PDMS composite membrane for gas separation, where a membrane obtained in the step 1 needs to undergo a plasma treatment for 1 s to 20 s at a current of 0.1 A to 5 A and a voltage of 20 V to 150 V.

The heat treatment in the step 1 and the heat treatment in the step 2 are performed at 30° C. to for 2 h to 20 h.

The hydroxyl-terminated PDMS, the crosslinking agent, the catalyst, and the PDMS-b-PEO are in a weight ratio of 100:(5-15):(0.1-2):(50-150).

The first solvent is a hydrocarbon solvent, and the second solvent is an alcohol-water mixture.

A use of the PE-b-PA/PDMS composite membrane for gas separation in gas separation is provided.

A method for improving an enrichment degree of PEO segments on a surface of a membrane layer is provided, where the membrane layer includes hydroxyl-terminated PDMS and PDMS-b-PEO; and the method allows PEO segments in the membrane layer to migrate to and aggregate on the surface of the membrane layer through a plasma treatment on the surface of the membrane layer.

A mass ratio of the hydroxyl-terminated PDMS to the PDMS-b-PEO in the membrane layer is 1:(0.5-1.5).

The plasma treatment is performed for 1 s to 20 s at a current of 0.1 A to 5 A and a voltage of 20 V to 150 V.

A method for alleviating a decrease in a gas permeation rate of a gas separation membrane is provided, where the gas separation membrane includes a support layer, an intermediate layer, and a selective layer; and the method includes: further adding hydroxyl-terminated PDMS and PDMS-b-PEO during preparation of the intermediate layer.

DETAILED DESCRIPTION OF THE EMBODIMENTS

Figure 1:
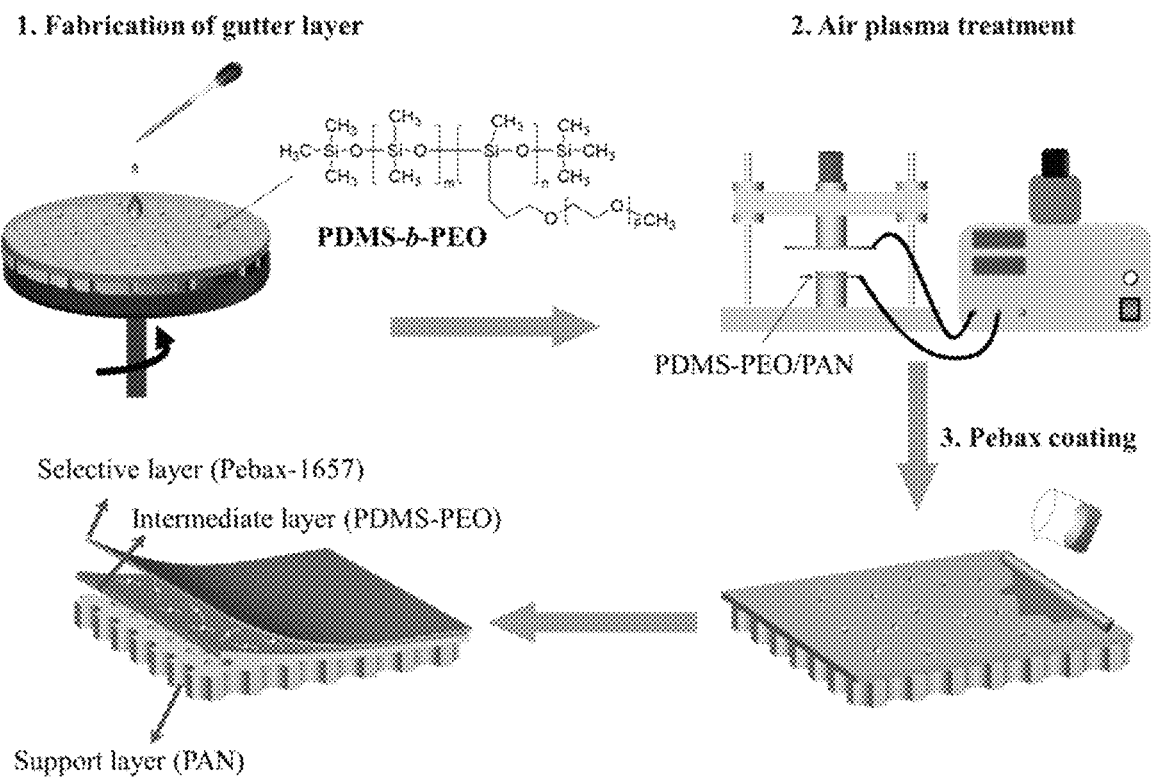
FIG. 1 shows a schematic diagram of a molecular structure of PDMS-b-PEO and a preparation process of a Pebax/PDMS-PEO/PAN ultra-thin composite membrane, where a plasma treatment is directly performed in air.

In order to allow an excellent gas permeation rate, an ultra-fine thickness has always been a pursuit of the composite membrane technology, where the control of interfacial compatibility among a plurality of layers is still a huge challenge. A technical route of the present disclosure is shown in FIG. 1, where an amphoteric copolymer PDMS-b-PEO is introduced into an intermediate layer to adjust the interfacial binding performance, thereby promoting preparation of an ultra-thin Pebax composite membrane. Studies have shown that the surface enrichment of PEO segments not only inhibits a dense $SiO_x$ layer formed due to a plasma treatment of a PDMS intermediate layer, but also provides additional hydrophilic sites and interfacial compatibility for the subsequent Pebax selective layer. The presence of PDMS-b-PEO in an intermediate layer allows the successful preparation of a Pebax selective layer with a thickness of about 50 nm. The resulting ultra-thin Pebax composite membrane exhibits excellent performance, with a carbon dioxide permeation rate of 2,142 GPU and a carbon dioxide/nitrogen selectivity of 36. The strategy of using an amphoteric copolymer as an intermediate layer enhances the integrity of a composite membrane and simplifies the plasma pretreatment, indicating a great potential for developing a high-permeation-rate membrane for efficient $CO_2$ capture.

Main Raw Materials:
Hydroxyl-terminated PDMS (Mw=60,000);
PDMS-b-PEO (50% to 55%, Mw=5,000); and
PE-b-PA (Pebax-1657, Arkema, France).

Preparation of a Composite Membrane

A hydroxyl-terminated PDMS monomer, TEOS (a cross-linking agent), and dibutyltin dilaurate (DBTDL) (a catalyst) were mixed according to a mass ratio of 100:10:1 in 150 mL of n-heptane to prepare a PDMS casting solution; then, a specified amount of PDMS-b-PEO was added to the PDMS casting solution, and the resulting mixture was thoroughly stirred until there were no obvious flocs to obtain a homogeneous solution; the homogeneous solution with an appropriate viscosity was spin-coated on a surface of a PAN support; and the resulting product was subjected to a heat treatment at 60° C. for 12 h to obtain a PDMS-PEO/PAN membrane. A preparation process of a PDMS/PAN membrane was consistent with the preparation process of the PDMS-PEO/PAN membrane without the introduction of a copolymer PDMS-b-PEO.

Pebax-1657 polymer particles were dissolved in an ethanol (70 wt %)-water mixed solvent at 80° C. for 12 h. Before preparation of a Pebax-1657 composite membrane, the PDMS-PEO/PAN membrane was subjected to a plasma treatment at a current of 1 A and a voltage of 55 V in air to improve the surface wettability. A Pebax-1657 casting solution was deposited on a surface of PDMS-PEO through blade-coating; and the resulting product was subjected to a post-heat treatment at 60° C. for 12 h to obtain a Pebax/PDMS-PEO/PAN membrane.

Hydrophilic Modification Results of a Surface of an Intermediate Layer

Figure 2:
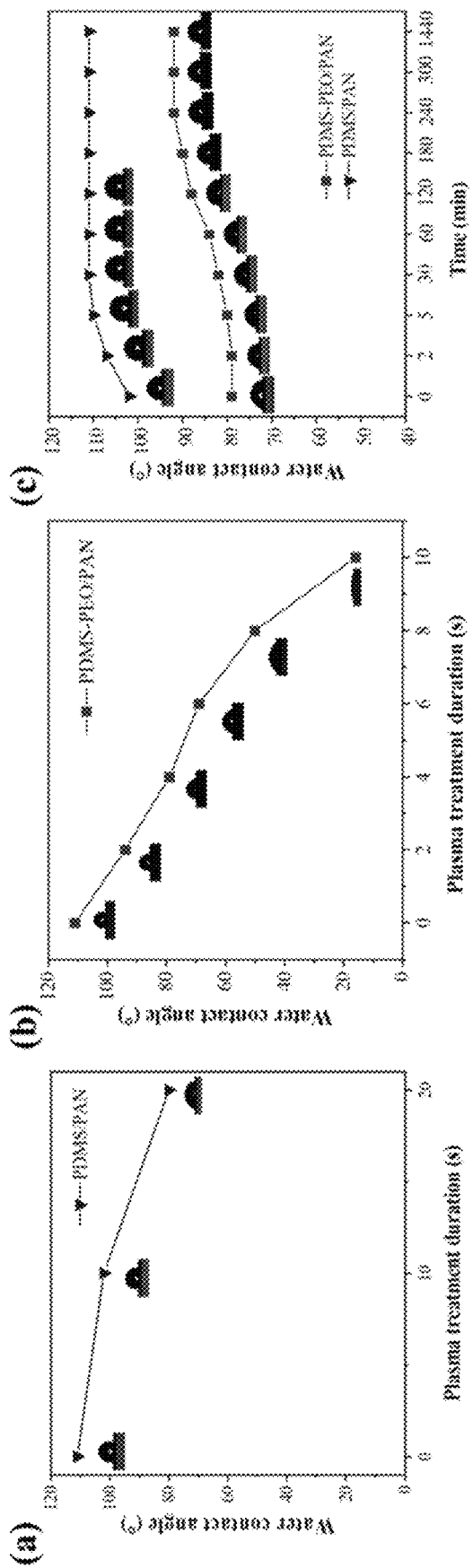
FIG. 2 shows a relationship between a water contact angle (WCA) and a plasma treatment duration, where (a) is for a PDMS/PAN membrane; (b) is for a PDMS-PEO/PAN membrane (mPDMS:mPDMS-b-PEO=1:1); and (c) shows a hydrophobic recovery behavior of a 4 s-plasma-treated membrane.

The selective layer Pebax includes hydrophilic PEO segments, inhibiting the uniform deposition and adhesion of the selective layer on a hydrophobic surface of the PDMS intermediate layer. Therefore, the surface of PDMS is hydrophilically modified. In general, a physical method such as UV irradiation and plasma treatment can provide enough energy to break strong Si—O and Si—C bonds to produce hydroxyl, thereby improving the water wettability. In this process, a pure oxygen atmosphere is often required to increase the generation efficiency of hydroxyl. In order to allow hydrophilic modification in air, the present disclosure adopts a PDMS-b-PEO copolymer to provide additional hydrophilic sites on a surface of the intermediate layer. The presence of PDMS segments in the copolymer enhances the compatibility between hydrophilic PEO segments and PDMS. As shown in (a) of FIG. 2, after a long duration of plasma treatment (20 s), a WCA on a PDMS surface drops from 110° to 80°. In addition, as shown in (c) of FIG. 2, the hydrophobicity of the PDMS surface is gradually recovered to an initial state within 5 min due to the migration of PDMS oligomers and the reorientation of polar groups. It should be noted that the PDMS-PEO surface can remain hydrophilic (WCA<90°) within 3 h, and a stable WCA is 92°, which is significantly lower than an initial value (110°). Thus, the introduction of the PDMS-b-PEO copolymer ensures sufficient time to deposit the Pebax solution on a surface of the PDMS intermediate layer.

Figure 3:
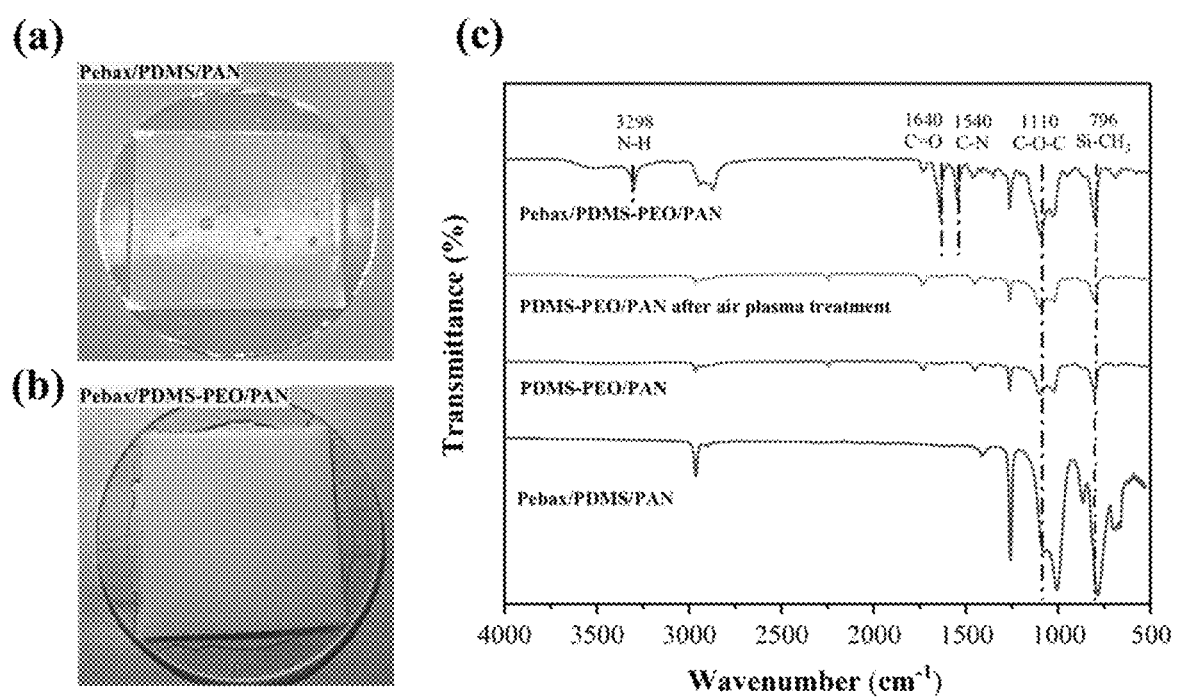
FIG. 3 shows pictures of Pebax solutions coated on different intermediate layers, where (a) is for PDMS without PDMS-b-PEO and (b) is for PDMS-PEO; all samples are subjected to a 4 s-air plasma treatment; and (c) shows attenuated total reflection-fourier transform infrared (ATR-FTIR) spectra of different types of membranes (mPDMS: mPDMS-b-PEO=1:1; and Pebax solution concentration: 0.5 wt %).
Figure 4:
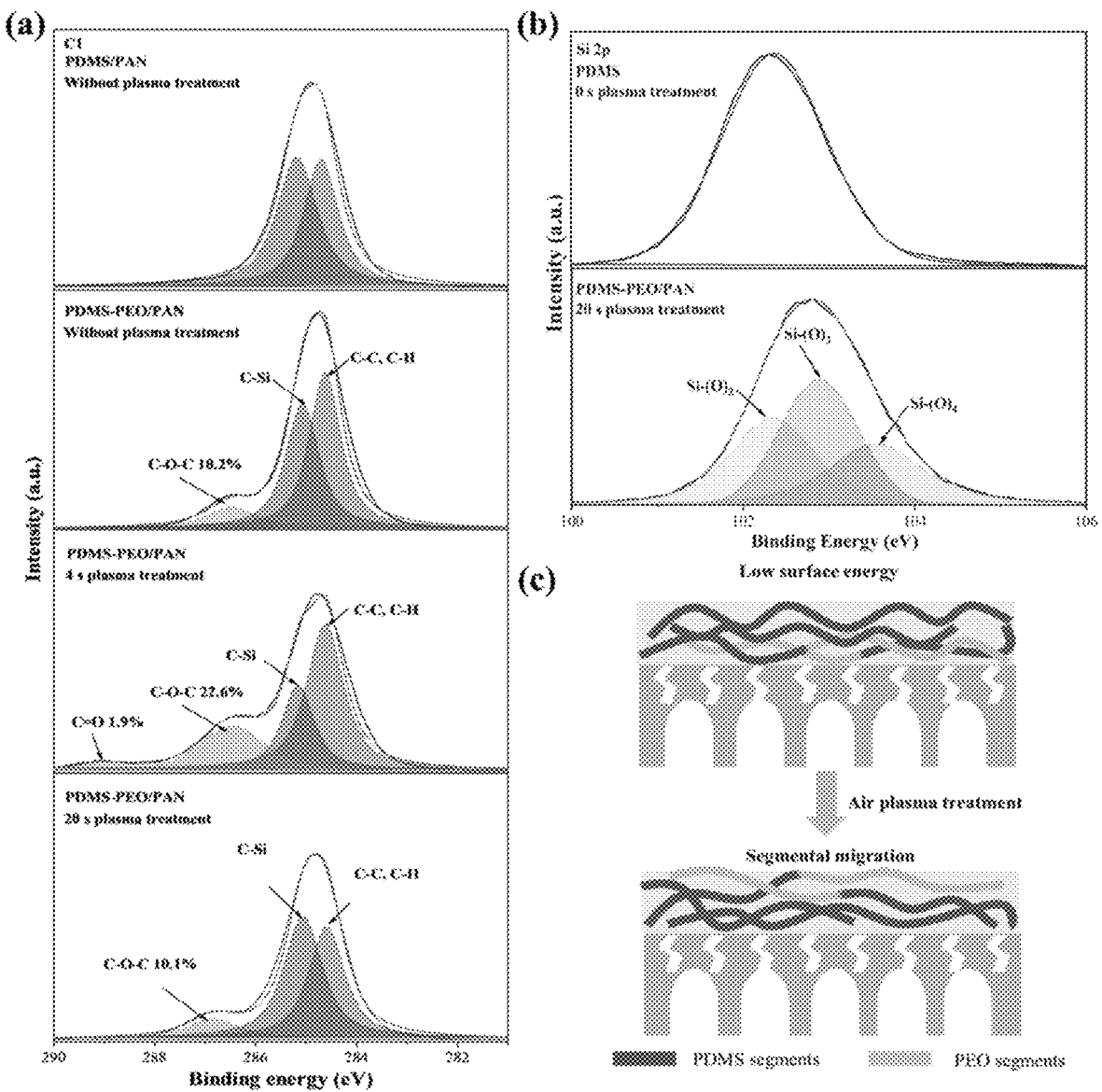
In FIG. 4, (a) shows C1s X-ray photoelectron spectroscopy (XPS) spectra of PDMS samples obtained after different plasma treatment durations (from 0 s to 20 s); (b) shows Si2p-XPS spectra of a PDMS/PAN membrane and a PDMS-PEO/PAN membrane; and (c) is a schematic diagram of a migration behavior of a PEO segment from a polymer matrix to a surface after a plasma treatment.

Deposition behaviors of the Pebax casting solution on different types of intermediate layers are further investigated. As shown in (a) of FIG. 3, the Pebax solution aggregates on the original PDMS surface (without the introduction of the PDMS-b-PEO copolymer) in the form of dispersed droplets, which confirms that the hydrophobic PDMS has poor adhesion. In addition, a significant characteristic peak of Pebax is not observed in a Pebax/PDMS/PAN sample. In contrast, the Pebax casting solution is well deposited on the surface of the PDMS-PEO intermediate layer ((b) of FIG. 3), which is verified by the presence of an N—H stretching vibration peak at 3,298 cm' and a C=O stretching vibration peak at 1,640 cm' ((c) of FIG. 3). The presence of a Si—$CH_3$ adsorption peak indicates that the Pebax layer is thin enough to allow the penetration of infrared (IR) rays. However, after short-time air plasma activation, it is difficult to distinguish chemical bonds on a surface of a PDMS-PEO membrane, because ATR-FTIR results are insufficient to reflect changes in chemical bonds. For further explanation, the XPS technology is used to analyze chemical bonds of the intermediate layer. As shown in (a) of FIG. 4, a C1s spectrum of a PDMS-based sample has four peaks at binding energies of 288.6 eV, 286.5 eV, 284.8 eV, and 284.6 eV, and the four peaks correspond to C=O, C—O—C, C—Si, and C—C, respectively. Among these chemical bonds, a content of the ether bond can reflect an enrichment degree of PEO segments on a surface of the intermediate layer. With pure PDMS as a reference, some PEO segments can be exposed on a surface without a plasma treatment, and when an air plasma treatment duration is extended to 4 s, a C—O—C content increases from 10.2% to 22.6%, indicating that increased PEO segments migrate from an inside to a surface of the intermediate layer to expose abundant hydrophilic sites. This result is consistent with a result of a WCA test. The presence of the C=O bond indicates partial decomposition of PEO segments. When the plasma treatment duration reaches 20 s, the content of the ether bond drops to 10.1%. Moreover, a long pretreatment time can lead to the generation of increased hydroxyl groups, resulting in a reduced WCA. In (c) of FIG. 4, Si 2p XPS spectra of the original PDMS and the PDMS-PEO intermediate layer are compared, where the two samples both are subjected to an air plasma treatment for 20 s. The PDMS sample has a single characteristic peak at 102.1 eV, which corresponds to the binding of a silicon atom to two oxygen atoms. After a plasma treatment, a Si 2p peak of the PDMS-PEO sample is shifted to a high binding energy region, and a complicated component can be decomposed into three parts. A Si—$(O)_2$ peak is at 102.1 eV, a Si—$(O)_3$ peak is at 102.8 eV, and a Si—$(O)_4$ peak is at 103.4 eV. The presence of the Si—$(O)_4$ peak indicates that $SiO_2$ on PDMS is produced after the plasma treatment.

The migration and rearrangement of polymer segments are driven by thermal motion and surface polarity. A fluorinated chain can spontaneously migrate to a surface of the membrane and reduce the surface energy. In the present disclosure, PEO segments that exhibit high polarity and hydrophilicity tend to aggregate and entangle in a hydrophobic environment, which further leads to the coverage of PDMS segments ((c) of FIG. 4). During an air plasma treatment process, the generated hydroxyl increases the surface polarity and promotes the migration and aggregation of PEO segments to a surface of the membrane, which finally induces the optimization of hydrophilicity. In addition, the PDMS-b-PEO copolymer with a linear structure and a low molecular weight exhibits high fluidity. In contrast, the motion of PDMS segments is limited by a cross-linked network.

Figure 5:
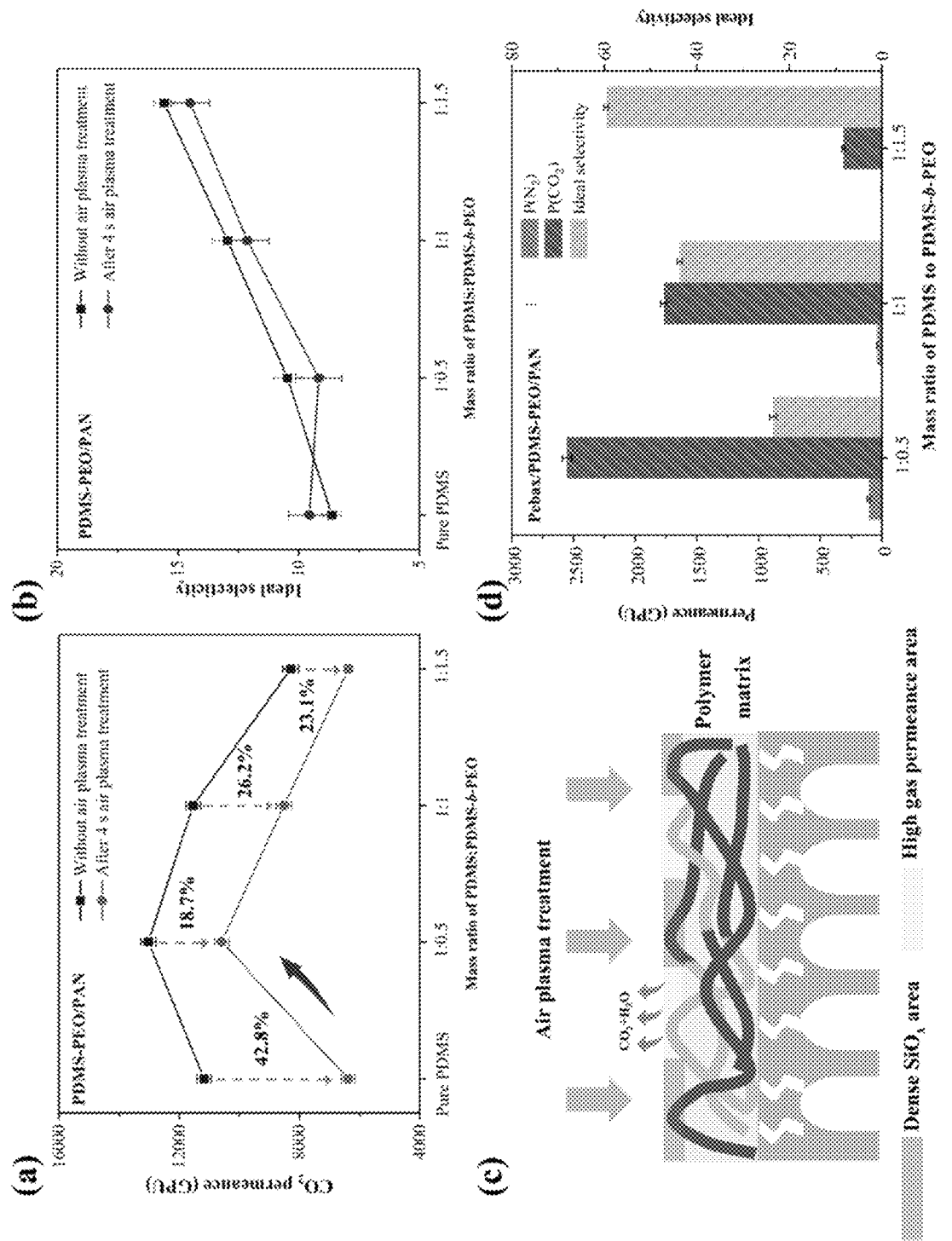
FIG. 5 shows an impact of an incorporated copolymer amount on $CO_2$ transmittance (a) and ideal selectivity (b) of a PDMS-PEO/PAN membrane; a schematic diagram of a surface composition of a PDMS-PEO/PAN membrane after an air plasma treatment (c); and an impact of an incorporated copolymer amount on the separation performance of a Pebax/PDMS-PEO/PAN membrane (Pebax solution concentration: 0.5 wt %; air plasma treatment duration: 4 s; and test conditions: pure gas, 30° C., 0.3 MPa) (d).

$CO_2$ permeation rates of PDMS intermediate layers prepared with different doped PDMS-b-PEO amounts are shown in (a) of FIG. 5. When a mass ratio of PDMS to PDMS-b-PEO reaches 1:0.5, a $CO_2$ permeation rate increases from 11,174 GPU (pure membrane) to 13,030

Figure 6:
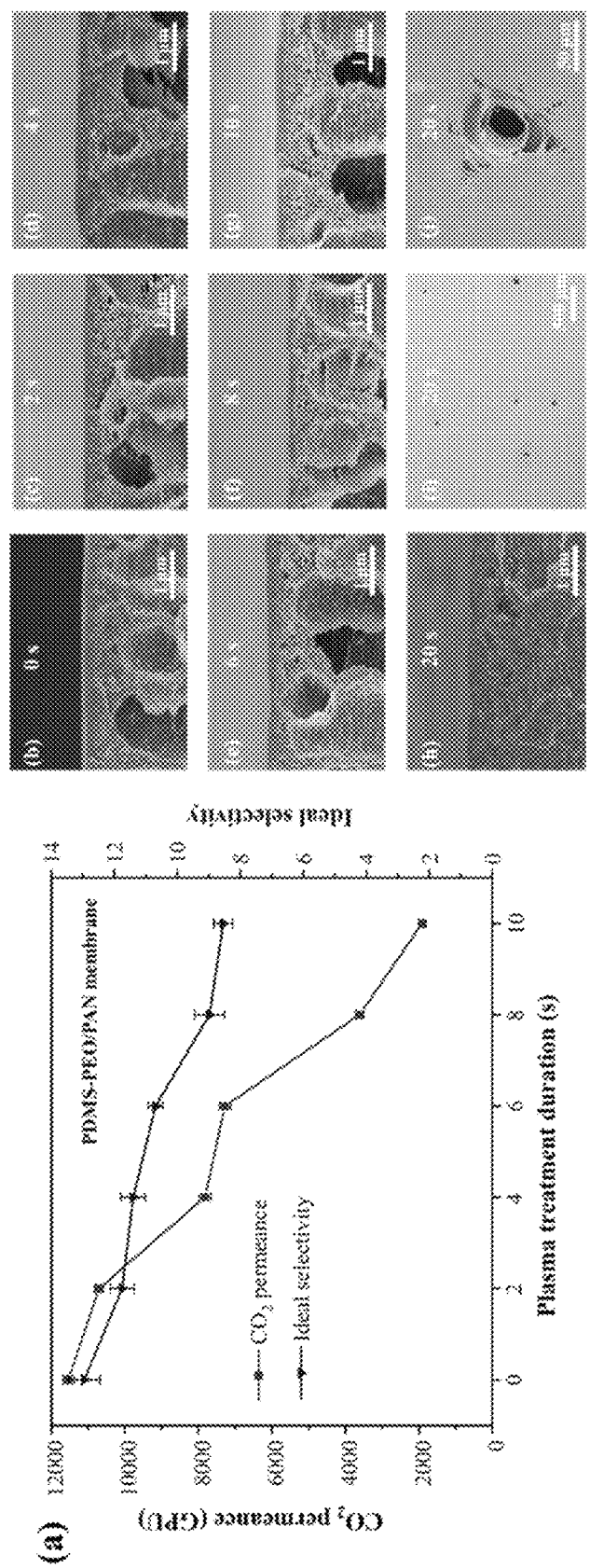
FIG. 6 shows an impact of a plasma treatment duration on the separation performance of a PDMS-PEO/PAN membrane (mPDMS:mPDMS-b-PEO=1:1, and test conditions: pure gas, 0.3 MPa) (a); and cross-sectional ((b) to (h)) and surface ((i) to (j)) scanning electron microscopy (SEM) images of PDMS-PEO/PAN membranes obtained after different plasma treatment durations (from 0 s to 20 s).

GPU, which is attributed to the affinity of PEO segments for $CO_2$ molecules. In addition, a small number of PEO segments do not have an inhibitory effect on the stacked structure and permeability of the polymer. Through an increase in a PDMS-b-PEO content, the crystallization and segment migration behaviors of PEO segments result in a significant decrease in a $CO_2$ permeation rate, but the $CO_2/N_2$ selectivity increases from 10.5 to 15.8 ((b) of FIG. 5). It should be noted that, after 4 s of an air plasma treatment, a $CO_2$ permeation rate of the pure PDMS intermediate layer decreases by 42.8%. In contrast, the introduction of PDMS-b-PEO effectively alleviates the reduction of a gas permeation rate. As shown in (a) of FIG. 5, after a plasma treatment, a decrease rate of a gas permeation rate of the PDMS-PEO intermediate layer is controlled to be 27% or less. To further explain this phenomenon, a distribution model of the surface structure is proposed ((c) of FIG. 5). As described above, after PDMS is subjected to a plasma treatment, a $SiO_x$ layer is inevitably formed, which increases the resistance for gas transport. If polymer chains migrate and rearrange during an air plasma treatment process, increased PEO segments are exposed on a surface of a membrane, and some polymer chains may be dissociated into carbon dioxide and water. As a result, a dense $SiO_x$ region is replaced by a region with much lower resistance for gas transport than the dense $SiO_x$ region, resulting in a high gas permeation rate. The selectivity of an intermediate layer undergoing a plasma treatment is shown in FIG. 6.

An increase in the doped copolymer amount also enriches hydrophilic sites after a plasma treatment to further increase an affinity for a Pebax solution, which makes increased Pebax deposited on a surface of the intermediate layer and increases a thickness of the selective layer. As a result, a carbon dioxide permeation rate significantly drops from 2,554 GPU to 312 GPU. The enhancement of selectivity (from 23.6 to 59.6) is attributed to a complete structure of the selective layer ((d) of FIG. 5). To balance the gas permeation rate and selectivity, 1:1 is selected as an optimal mass ratio of PDMS:PDMS-b-PEO.

Impacts of an Air Plasma Treatment Duration

The air plasma treatment duration affects not only the surface wettability, but also the formation of the Pebax selective layer. To improve the interfacial adhesion of the Pebax layer, a long plasma treatment duration is required to make a surface of the intermediate layer have high hydrophilicity. However, oxygen plasma can break Si—$CH_3$ bonds and cause the bonding of silicon atoms with oxygen atoms to form a silicon-like layer. The $SiO_x$ layer has high transport resistance, and a thickness of the $SiO_x$ layer is positively correlated with the plasma treatment duration. When the plasma treatment duration is extended to 10 s, a carbon dioxide permeation rate of the PDMS-PEO/PAN membrane decreases from 11,538 GPU to 1,913 GPU ((a) of FIG. 6). According to the literature, a highly-crosslinked structure of the $SiO_x$ layer may improve a screening capacity to increase the gas selectivity; and the $CO_2/N_2$ selectivity of the PDMS-PEO intermediate layer decreases from 12.95 to 8.54 in the present disclosure. In view of a possible damage caused by high-energy plasma to the PDMS-PEO/PAN membrane, microstructures of membranes obtained after different plasma treatment durations are compared. As shown by (b) to (j) of FIG. 6, pores of the PAN support obviously collapse after 20 s of a plasma treatment. In addition, large defects of tens of microns are observed on a surface of the PDMS-PEO intermediate layer.

Figure 7:
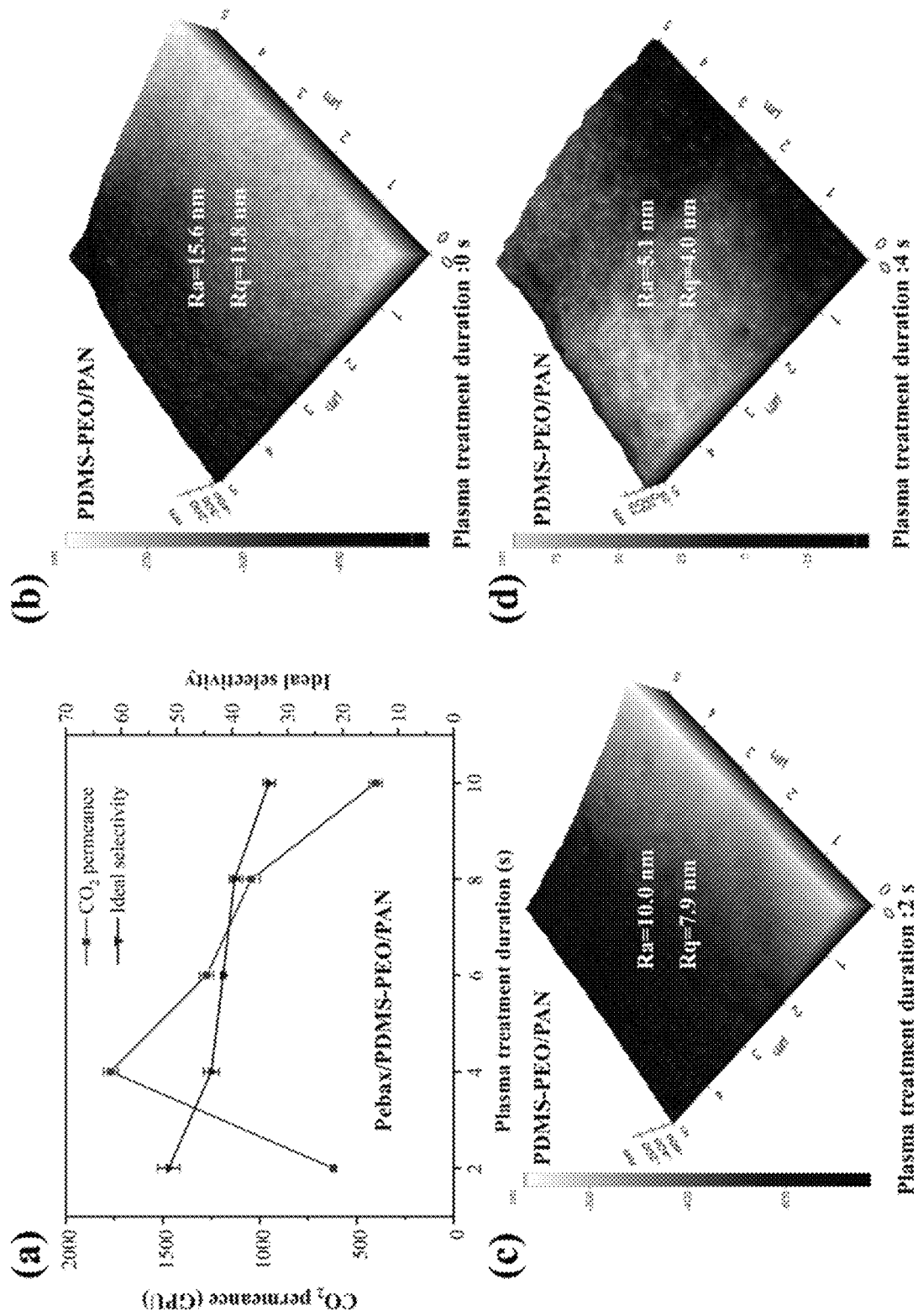
FIG. 7 shows an impact of a plasma treatment duration on the separation performance of a Pebax/PDMS-PEO/PAN membrane (mPDMS:mPDMS-b-PEO=1:1; Pebax solution concentration: 0.5 wt %; and test conditions: pure gas, 30° C., 0.3 MPa) (a); and atomic force microscopy (AFM) images and surface roughness values of PDMS-PEO/PAN membranes obtained after different plasma treatment durations ((b) to (d)).

Under different plasma treatment durations, the Pebax casting solution is deposited on the PDMS-PEO intermediate layer; and a change in a carbon dioxide permeation rate can be divided into two distinct processes ((a) of FIG. 7), where the decrease from 4 s to 10 s is attributed to a combined effect of a large thickness of the $SiO_x$ layer and the collapse of pores in the support. With a same casting solution concentration, Pebax-4s has a much higher carbon dioxide permeation rate than Pebax-2s. AFM images ((b) to (d) of FIG. 7) show that the extension of a plasma treatment duration reduces the surface roughness (Ra decreases from 15.6 nm to 5.1 nm). A rough surface enhances an interaction with a casting solution, which allows to an increased amount of the casting solution to remain and increases a thickness of the selective layer. Moreover, increased defects, together with a small thickness of the Pebax layer, make the $CO_2/N_2$ selectivity decrease from 51.4 to 33.3. Therefore, 4 s is an optimal air plasma treatment duration to obtain a PDMS-PEO intermediate layer with a relatively complete structure and an appropriate surface roughness.

Separation Performance of a Pebax/PDMS-PEO/PAN Composite Membrane

Figure 8:
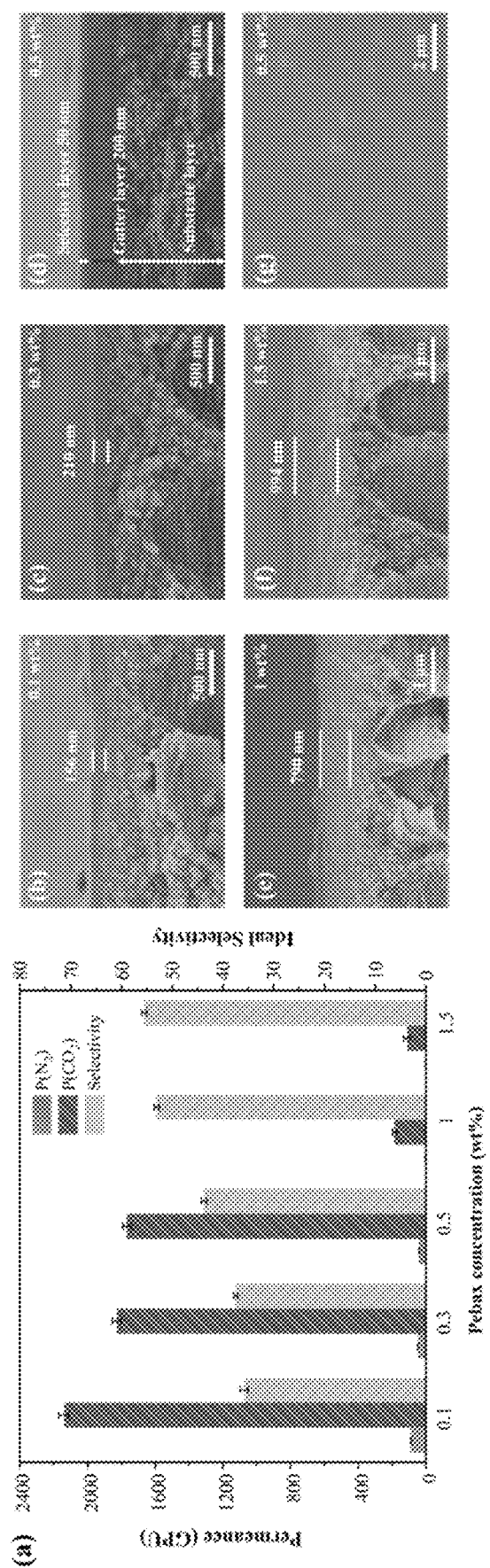
FIG. 8 shows an impact of a Pebax concentration on the separation performance of a membrane (mPDMS:mPDMS-b-PEO=1:1; air plasma treatment duration: 4 s; and test conditions: pure gas, 30° C., 0.3 MPa) (a); and cross-sectional ((b) to (f)) and surface (g) SEM images of Pebax/PDMS-PEO/PAN membranes prepared with Pebax casting solutions of different concentrations.

After preparation conditions of the PDMS-PEO intermediate layer are optimized, an impact of a concentration of the Pebax casting solution on the separation performance of the Pebax/PDMS-PEO/PAN composite membrane is investigated. As shown in (a) of FIG. 8, with the increase in a Pebax concentration, a carbon dioxide permeation rate decreases from 2,141 GPU to 112 GPU; and a thickness of the membrane (the intermediate layer is combined with the selective layer) varies from 156 nm to 994 nm ((b) of FIG. 8). A high thickness of the membrane will inevitably increase the resistance for gas transport, resulting in a low permeation rate. A structure of the membrane tends to be complete, resulting in high selectivity. As a polymer concentration increases from 0.1 wt % to 1.5 wt %, the $CO_2/N_2$ selectivity increases by almost 55% (from 35.8 to 55.5). When a polymer concentration is lower than 0.3 wt %, it is difficult to distinguish between the Pebax selective layer and the PDMS-PEO intermediate layer under SEM. A high polymer concentration of 0.5 wt % is adopted to allow a boundary between the intermediate layer and the selective layer to be clearly observed. The selective layer has a thickness of about 50 nm, and the intermediate layer has a thickness of about 200 nm. Notably, it can be seen from (d) to (f) of FIG. 8 that the two layers are tightly bonded together without any interfacial defects. The adhesion between the Pebax selective layer and the PDMS-PEO intermediate layer can be produced through the following two interactions: 1. Hydroxyl groups produced by air plasma interact with oxygen-containing functional groups of Pebax to create a hydrogen bond network. 2. An exposed PEO segment of the PDMS-PEO membrane exhibits a strong affinity for a same portion of Pebax. These two interactions strengthen the entanglement of physical fragments at an interface of the two polymers.

Figure 9:
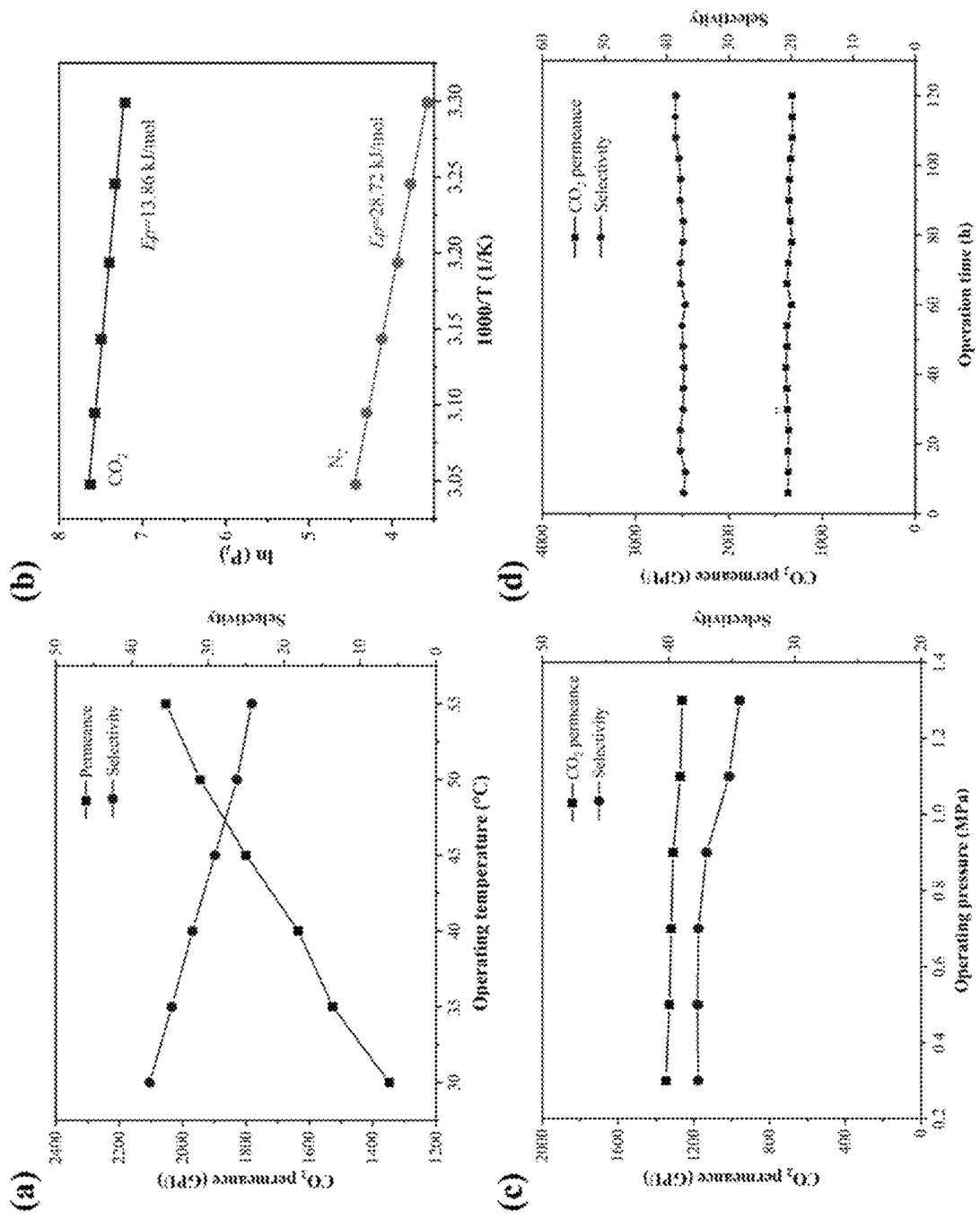
FIG. 9 shows an impact of an operating condition on the separation performance of a Pebax/PDMS-PEO/PAN composite membrane, where (a) is for an operating temperature, (b) is for Arrhenius of $CO_2$ and $N_2$, (c) is for an operating pressure, and (d) is for an operating time (membrane preparation conditions: mPDMS:mPDMS-b-PEO=1:1, air plasma treatment duration: 4 s, Pebax casting solution concentration: 0.5 wt %; and feed gas: 15 vol % $CO_2$: 85 vol % $N_2$).

A mixed gas ($CO_2:N_2$=15 vol %:85 vol %) is used to investigate an impact of an operating condition on the separation performance of the Pebax/PDMS-PEO/PAN composite membrane. As shown in (a) of FIG. 9, the increase in a temperature provides an increased driving force, resulting in an increase in gas separation performance. A temperature-dependent relationship of the gas permeation rate follows the Arrhenius equation $$P_i = P_{i,0} \exp\left(\frac{-E_P}{RT}\right),$$

where $P_i$ represents a permeation rate of a component i, $P_{i,0}$ represents a prefactor, $E_P$ represents an activation energy, R represents a gas constant, and T represents an operating temperature (unit: K). As shown in (b) of FIG. 9, an activation energy of $N_2$ is high, indicating that, with the increase of the temperature, a $N_2$ permeation rate increases faster than a $CO_2$ permeation rate. As shown in (c) of FIG. 9, with the increase in an operating pressure, the permeation rate and selectivity decrease, which is attributed to the adsorption competition often observed during permeation of the mixed gas. Subsequently, the permeation of the mixed gas is performed continuously for 120 h. During a test process, the carbon dioxide permeation rate and selectivity are stabilized at 1,339 GPU and 38.5, respectively ((d) of FIG. 9).

What is claimed is:

1. A polyether block polyamide-polydimethylsiloxane composite membrane for gas separation, comprising: a support layer, an intermediate layer, and a selective layer, wherein the intermediate layer comprises a hydroxyl-terminated polydimethylsiloxane and a polydimethylsiloxane block polyethylene oxide, and the selective layer is made of a polyether block polyamide;

the hydroxyl-terminated polydimethylsiloxane and the polydimethylsiloxane block polyethylene oxide in the intermediate layer are crosslinked, and a crosslinking agent used in crosslinking of the hydroxyl-terminated polydimethylsiloxane and the polydimethylsiloxane block polyethylene oxide is tetraethyl orthosilicate;

the hydroxyl-terminated polydimethylsiloxane has a molecular weight of 20,000 to 200,000; the polydimethylsiloxane block polyethylene oxide has a molecular weight of 2,000 to 20,000; and a preparation method of the polyether block polyamide-polydimethylsiloxane composite membrane for gas separation comprises the following steps:

step 1: thoroughly mixing the hydroxyl-terminated polydimethylsiloxane, the crosslinking agent, a catalyst, the polydimethylsiloxane block polyethylene oxide, and a first solvent to obtain an intermediate layer casting solution, coating the intermediate layer casting solution on a surface of the support layer, and performing a heat treatment; and step 2: dissolving the polyether block polyamide in a second solvent, coating a resulting casting solution on a surface of the intermediate layer obtained in the step 1, and performing a heat treatment to obtain the polyether block polyamide-polydimethylsiloxane composite membrane for gas separation, wherein a membrane obtained in the step 1 undergoes a plasma treatment for 1 s to 20 s at a current of 0.1 A to 5 A and a voltage of 20 V to 150 V.

2. The polyether block polyamide-polydimethylsiloxane composite membrane for gas separation according to claim 1, wherein a mass ratio of the hydroxyl-terminated polydimethylsiloxane to the polydimethylsiloxane block polyethylene oxide in the intermediate layer is 1:(0.5-1.5).

3. The polyether block polyamide-polydimethylsiloxane composite membrane for gas separation according to claim 1, wherein the heat treatment in the step 1 and/or the heat treatment in the step 2 are performed at 30° C. to 80° C. for 2 h to 20 h.

4. The polyether block polyamide-polydimethylsiloxane composite membrane for gas separation according to claim 1, wherein the hydroxyl-terminated polydimethylsiloxane, the crosslinking agent, the catalyst, and the polydimethylsiloxane block polyethylene oxide are in a weight ratio of 100:(5-15):(0.1-2):(50-150); the first solvent is a hydrocarbon solvent; and the second solvent is an alcohol-water mixture.

* * * * *